Patented June 25, 1946

2,402,896

UNITED STATES PATENT OFFICE 2,402,896

INSECTICIDE

Theodore W. Kerr, Jr., Seymour, Conn., assignor to United States Rubber Company, New York, N. Y., a corporation of New Jersey No Drawing. Application November 15, 1944, Serial No. 563,621

2 Claims. (Cl. 167—30)

This invention relates to improvements in insecticides.

I have discovered that mixtures of a compound having the general formula 2,2-bis(aromatic radical)-1,1,1-trihaloethane and the oily product of the condensation of an aromatic hydrocarbon or a nuclear-halogen substitution product thereof with an alkylene halide exhibit a synergistic insecticidal action. These two classes of materials are each known as insecticides per se. (See United States Patents to Müller No. 2,329,074 and to ter Horst No. 2,243,543, respectively.) The term insecticide is considered to include larvicides, arachnicides, insectifuges and larvifuges.

Examples of compounds having the general formula 2,2-bis(aromatic radical)-1,1,1-trihaloethane that may be used are 2,2-bis(phenyl)-1,1,1-trichloroethane, 2,2-bis(p-chlorophenyl)-1,1,1-trichloroethane, 2,2-bis(α-naphthyl)-1,1,1-trichloroethane, 2,2-bis(p-xenyl)-1,1,1-trichloroethane, 2,2-bis(p-thiocyanophenyl)-1,1,1-trichloroethane, 2,2-bis(p-tolyl)-1,1,1-trichloroethane. These may be prepared in known manner by condensing chloral or chloral hydrate with the desired aromatic compound to give the selected aromatic radical in the general formula. Examples of aromatic hydrocarbons and nuclear-halogen substitution products thereof that may be condensed with alkylene halides as shown in the ter Horst Patent No. 2,243,543 are benzene, monochlorobenzene, dichlorobenzene, trichlorobenzene, benzylchloride, diphenyls, chlorinated diphenyls, dibenzyl, toluene, xylene, ethylbenzene, naphthalene. Examples of the alkylene halides are methylene chloride, ethylene chloride, propylene chloride, amylene chloride, tetrachlorethane, trichlorethylene.

The compounds having the general formula 2,2-bis(aromatic radical)-1,1,1-trihaloethane are solids and are soluble to a relatively high concentration in the oily condensation products of the aromatic hydrocarbons or the nuclear-halogen substitution products thereof with alkylene halides. For example, 2,2-bis(p-chlorophenyl)-1,1,1-trichloroethane is soluble in the oily condensation product of monochlorobenzene and ethylene chloride to the extent of over 30 parts of the former per 100 parts of the latter. It is preferred to use such solutions emulsified in water with the aid of commercial wetting agents as insecticides, but if desired the two materials may be separately dispersed and mixed together, or an excess of the solid powder over the amount that is soluble in the oily condensation product may be used and the solution with the undissolved powder dispersed in water. If desired, the insecticides may be applied in a mutual solvent medium.

The following examples, which are illustrative of the invention, clearly show the synergistic insecticidal effect of mixtures of 2,2-bis(p-chlorophenyl)-1,1,1-trichloroethane and the oily product of the condensation of monochlorobenzene and ethylene chloride. The 2,2-bis(p-chlorophenyl)-1,1,1-trichloroethane used was prepared in the conventional manner by reacting 1 mol of chloral with 2 mols of monochlorobenzene in the presence of an excess of concentrated sulfuric acid. After the reaction had stopped, the mixture was poured into a large amount of water, whereupon the 2,2-bis(p-chlorophenyl)-1,1,1-trichloroethane separated out. It may be washed and recrystallized from alcohol. The oily product of the condensation of monochlorobenzene with ethylene chloride was prepared similarly to Example 3 of the ter Horst Patent No. 2,243,543 by reacting equimolar proportions of monochlorobenzene and ethylene chloride in the presence of aluminum chloride for six hours, stopping the reaction by the addition of water, and separating the oily lower layer. Unreacted monochlorobenzene and ethylene chloride were removed by distillation, and the crude oily product remaining was vacuum distilled at 250–350° C. at 50 mm. mercury pressure. The oily product of the condensation reaction thus distilled was used in some of the examples and will be termed "whole oil." The fraction of this "whole oil" distilling at 140–165° C. at 3 mm. mercury pressure was also used in some of the examples, and will be termed "fraction oil." The examples below describe tests showing the action on various insects of aqueous dispersions of the 2,2-bis(p-chlorophenyl)-1,1,1-trichloroethane, "whole oil," "fraction oil," and mixtures of the same which were prepared at the desired dilutions for the various tests in the conventional manner, with the aid of suitable dispersing and wetting agents in amounts which were known to be non-toxic to the insects under test.

*Example I*

The effectiveness of the 2,2-bis(p-chlorophenyl)-1,1,1-trichloroethane, the "whole oil," the "fraction oil," and mixtures of the 2,2-bis(p-chlorophenyl)-1,1,1-trichloroethane with the "whole oil," and with the "fraction oil," was tested against the potato aphid, *Macrosiphum solanifolii*, by spraying potato leaves infested with the aphids with aqueous dispersions of the insecticide under test. There were 88 to 174 insects in four replications of each test.

The percentage mortality on the potato aphids after 24 hours of 1-200 dilutions of the insecticides was 8.0% for the 2,2-bis(p-chlorophenyl)-1,1,1-trichloroethane, 11.4% for the "whole oil," and 24.3% for the "fraction oil." 1-200 dilutions of a mixture of 1 part of 2,2-bis(p-chlorophenyl)-1,1,1-trichloroethane to 3 parts of the "whole oil," and to 3 parts of the "fraction oil," gave 64.9% mortality for the mixture of the 2,2-bis(p-chlorophenyl)-1,1,1-trichloroethane with the "whole oil," and 70.9% mortality for the mixture of the 2,2-bis(p-chlorophenyl)-1,1,1-trichloroethane with the "fraction oil," showing very definite synergistic action of the mixtures of the known insecticides.

A 1-800 dilution of 2,2-bis(p-chlorophenyl)-1,1,1-trichloroethane sprayed on potato aphids showed 15.4% mortality of the aphids after 24 hours. A 1-266 dilution of the "whole oil" showed 11.7% mortality after 24 hours. An aqueous dispersion of a mixture containing 1-800 dilution of 2,2-bis(p-chlorophenyl)-1,1,1-trichloroethane and 1-266 dilution of the "whole oil" showed 65.5% mortality after 24 hours, again illustrating the synergistic action of the mixture of known insecticides.

*Example II*

The synergistic effects found in the above tests were corroborated in field trials. Four replicates, each containing two, twenty-five foot rows of potato plants, were used for each treatment, and also for the control (untreated). 1-800 dilutions of 2,2-bis(p-chlorophenyl)-1,1,1-trichloroethane, of "fraction oil," and of a mixture of 1 part 2,2-bis(p-chlorophenyl) - 1,1,1 - trichloroethane and 3 parts "fraction oil" respectively, were sprayed on rows of potato plants as described above. Forty-eight hours after treatment potato insect populations were sampled by making ten sweeps with a twelve inch net in each replicate of each treatment and of the control. The average number of potato aphids per sweep of the net was .95 for the control, 1.05 for the 2,2-bis(p-chlorophenyl) - 1,1,1 - trichloroethane, .60 for the "fraction oil," and .25 for the mixture of 2,2-bis(p-chlorophenyl) - 1,1,1 - trichloroethane with the "fraction oil."

*Example III*

2,2 - bis(p-chlorophenyl) - 1,1,1 - trichloroethane, and "whole oil," and a mixture of the two were tested against the pea aphid, *Macrosiphum pisi*, by spraying leaves of *Vicia faba* (broad bean) infested with the aphids with aqueous dispersions of the insecticide under test. There were 126 to 185 insects in four replicates of each test. The percentage mortality was determined after 24 hours. A 1-800 dilution of 2,2-bis (p-chlorophenyl)-1,1,1-trichloroethane gave 27.0% mortality. A 1-266 dilution of "whole oil" gave 47.6% mortality. An aqueous dispersion of a mixture containing 1-800 dilution of 2,2-bis(p-chlorophenyl) - 1,1,1 - trichloroethane and 1-266 dilution of the "whole oil" gave 85.2% mortality.

2,2 - bis(p-chlorophenyl) - 1,1,1 - trichloroethane, and "fraction oil," and a mixture of the two, were similarly tested against pea aphids by spraying broad bean leaves infested with the aphids with 1-200 dilutions of the insecticide under test. There were 87 to 104 insects in four replicates of each test. The percentage mortality on the pea aphids after 24 hours of 1-200 dilutions of the insecticides was 50.6% for the 2,2-bis(p-chlorophenyl) - 1,1,1 - trichloroethane, and 64.8% for the "fraction oil." A 1-200 dilution of a mixture of 2.5 parts of 2,2-bis(p-chlorophenyl)-1,1,1-trichloroethane to 7.5 parts of the "fraction oil" gave 92.3% mortality.

*Example IV*

2,2 - bis(p-chlorophenyl) - 1,1,1 - trichloroethane, and "whole oil" and a mixture of the two, were tested against the Mexican bean beetle (*Epilachna varivestis*), by spraying bean leaves which were later infested by beetles with aqueous dispersions of the chemicals to be tested. There were 40 beetles in the four replicated tests with each dispersion. A 1-1089 dilution of 2,2-bis(p-chlorophenyl)-1,1,1-trichloroethane gave 5% mortality. A 1-363 dilution of "whole oil" gave 37.5% mortality. A dispersion of a mixture containing 1-800 dilution of 2,2-bis(p-chlorophenyl)-1,1,1-trichloroethane and 1-363 dilution of "whole oil" gave 92.5% mortality.

The synergistic insecticidal action of compositions containing 2,2-bis(p-chlorophenyl)-1,1,1-trichloroethane and the oily product of the condensation of monochlorobenzene with ethylenechloride is clearly demonstrated by the much greater total effect of the mixture than the sum of the two effects taken independently.

Having thus described my invention, what I claim and desire to protect by Letters Patent is:

1. An insecticidal composition containing 2,2-bis(p-chlorophenyl)-1,1,1 - trichloroethane and an oily distillation product of the condensation product of monochlorobenzene with ethylene dichloride.

2. An insecticidal preparation containing substantial amounts of each of 2,2-bis(p-chlorophenyl)-1,1,1-trichloroethane and an oily distillation product of the condensation product of monochlorobenzene with ethylene dichloride.

THEODORE W. KERR, Jr.